UNITED STATES PATENT OFFICE.

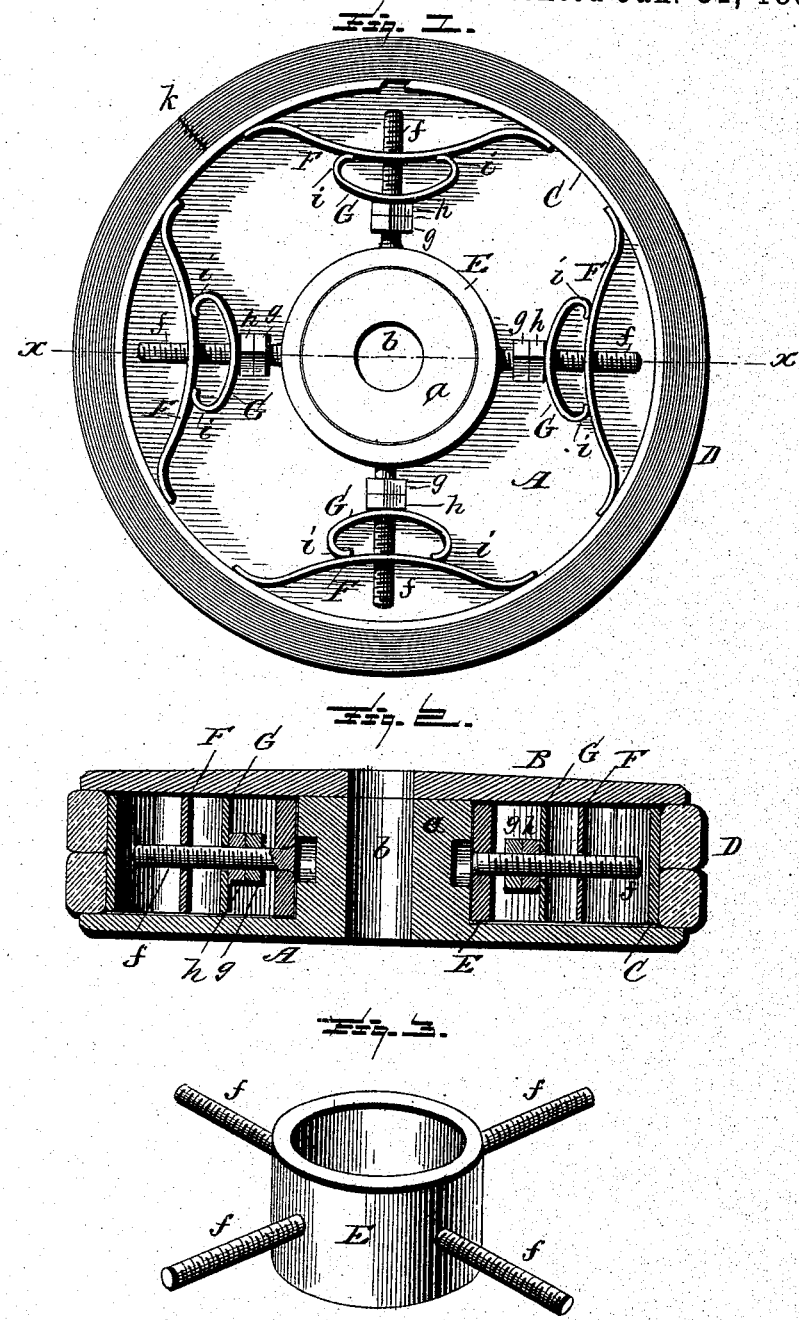

HENRY MELVIN LEE, OF WATERVILLE, MAINE.

PISTON-HEAD.

SPECIFICATION forming part of Letters Patent No. 490,913, dated January 31, 1893.

Application filed December 9, 1892. Serial No. 454,572. (No model.)

*To all whom it may concern:*

Be it known that I, HENRY MELVIN LEE, a citizen of the United States, residing at Waterville, in the county of Kennebec and State of Maine, have invented certain new and useful Improvements in Piston-Heads; and I do hereby declare that the following is a full, clear, and exact description of the same, reference being had to the annexed drawings, making a part of this specification, and to the letters of reference marked thereon.

The present invention has relation to that class of piston-heads in which are employed a split metal ring around which the packing is placed and suitable springs bearing against said ring and means for regulating the tension of the springs and consequent pressure against the ring.

The invention consists in a piston-head constructed substantially as shown in the drawings and hereinafter described and claimed.

Figure 1 of the drawings represents a plan view of a piston-head with the top plate removed to show the interior construction thereof. Fig. 2 a sectional elevation taken on line $x\,x$ of Fig. 1 showing the top plate in place. Fig. 3 a detail view of the thimble which carries the screw-rods for connecting the springs thereto.

In the accompanying drawings A represents the bottom plate of the piston head which is cast with the central upwardly extending hub $a$ having a central hole $b$ for the piston-rod, and B represents the top plate. Between the plates A B is located the usual split-ring C and around the exterior thereof is the packing rings D. Upon the central hub $a$ is loosely supported a thimble E, which thimble has radially extending screw-rods $f$ provided with nuts $g\,h$ for regulating the tension of the springs F G which loosely pass over the screw-rods, the former being designated as the main-spring and the latter the supplemental spring, thus forming a compound spring.

It is the purpose to secure as strong a pressure as possible and at the same time have it distributed with uniformity over the main spring in order to secure the best possible results. The main springs F which are flat and of the usual shape have the ends curved and press against the split-ring C in the ordinary manner, while the supplemental springs are different in construction from those in ordinary use, in that the springs are flat and have their ends curved inward as shown at $i$ and these ends are not rigidly connected to the main-spring but on the contrary press loosely thereon, consequently much better results are obtained. Each of the main-springs are provided with a supplemental spring with its ends bearing upon the main-spring at both sides of its center thus increasing its pressure throughout the length and with better effect. The tension of the supplemental spring upon the main-spring is regulated by the nuts $g\,h$ hereinbefore referred to. In those piston-heads where two or more packing rings are used it is found necessary to so place them with relation to each other that the joints as shown at $k$ will be broken or in other words not come on the same line. This was done of course to prevent any leakage in the piston-head, but it has been found in this class of piston-heads that the vibration thereof when the piston is in motion, will cause the packing-rings to turn on the split metal ring and shift their position with relation to each other so that the joints would not remain unbroken and as a result, the piston head would leak. Now to avoid this the thimble E is made to fit loosely over the hub $a$ so that any tendency the packing has to turn it will carry with it the split-ring, the thimble and its connections, thus insuring the packing-rings remaining stationary with relation to each other so that the joints will at all times be broken and thus avoid any leak in the piston-head. A further advantage of the thimble loosely fitting over the hub, is in the equalization of pressure of the springs, as any unequal pressure of one spring will be equalized by the thimble adjusting itself on the hub to give to all the springs bearing upon the split-ring uniformity of pressure.

Having now fully described my invention what I claim as new and desire to secure by Letters Patent, is:—

1. In a piston-head, the combination with the split metal ring and packing, of the thimble E loosely supported upon the hub $a$ and carrying compound springs and means for regulating them, substantially as and for the purpose set forth.

2. In a piston-head, the plate A cast with a central hub $a$, the split ring C and packing, in combination with the thimble E loosely supported upon the hub and adapted to turn thereon, said thimble having screw-rods $f$, compound springs F G, and means for regulating the tension of the compound springs, substantially as and for the purpose set forth.

In testimony that I claim the above I have hereunto subscribed my name in the presence of two witnesses.

HENRY MELVIN LEE.

Witnesses:
J. A. VIGNE,
H. C. HASKELL.